May 26, 1964　　　R. R. HAGER　　　3,134,601
SEAL CONSTRUCTION
Filed Nov. 2, 1962

INVENTOR.
ROBERT R. HAGER
BY
Richard G. Geib
ATTORNEY

United States Patent Office 3,134,601
Patented May 26, 1964

3,134,601
SEAL CONSTRUCTION
Robert R. Hager, South Bend, Ind., assignor to The Bendix Corporation, South Bend, Ind., a corporation of Delaware
Filed Nov. 2, 1962, Ser. No. 234,946
3 Claims. (Cl. 277—188)

The present invention relates to seals used for closing an opening between a housing and a central tubular structure.

More particularly, it is an object of this invention to provide a flexible seal which is easily positioned and positively held between two structures.

A further object is to provide a seal having spacer means to hold and compress the seal between concentric members to seal a passageway therebetween.

It is also an object of the present invention to provide a new and improved sealing structure which can be pressed on to a receiving structure which surrounds a reciprocating member to provide both a seal with respect to the reciprocating member and to the sidewalls of the aforementioned structure.

A still further object of the present invention is the provision of a new and improved sealing structure of the above-mentioned type which can be used to close off and bridge openings of large diameter relative to the reciprocating structure.

Figure 1:
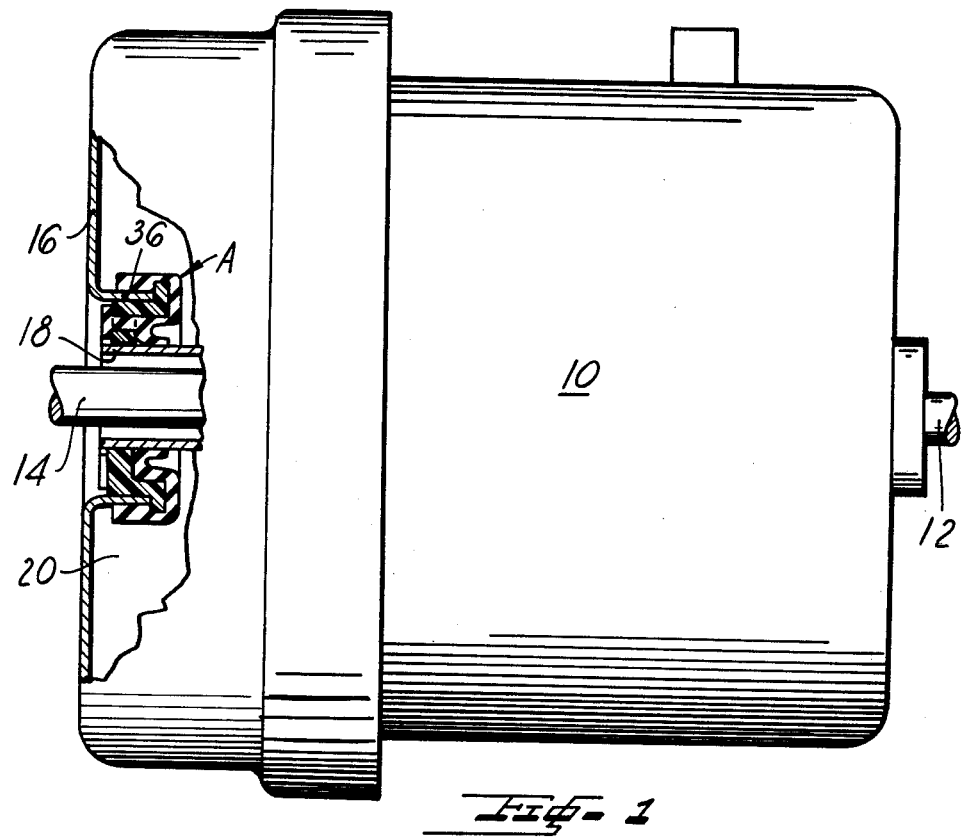
Figure 2:
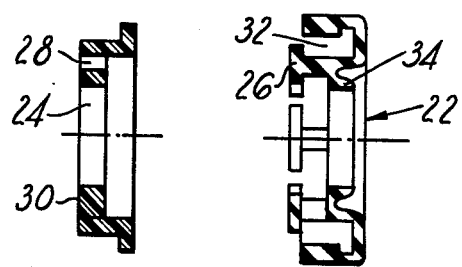

The invention resides in certain constructions and combinations and arrangements of parts; and further objects and advantages of the invention will become apparent to those skilled in the art to which it relates from the following description of the preferred embodiment described with reference to the accompanying drawings forming a part of this specification, and in which:

FIGURE 1 is a broken view of one end of a servomotor incorporating a seal construction in accordance with the principles of the present invention; and FIGURE 2 is an exploded view of my seal construction in sections showing the composite parts.

While the invention may be otherwise embodied, it is herein shown and described as being used in a servomotor 10, such as may be utilized with power assist clutches, brakes, accessory controls, etc. Such a unit includes a control rod 12 and a force transmitting rod 14 plus a motor housing structure 16. The control rod and force transmitting rod are centrally positioned within the housing 16 by a reciprocating valve housing 18. While not shown, it may be readily appreciated by those skilled in the art to which my invention relates that the servomotor 10 also includes a movable wall which is controlled by a pressure differential between two chambers, one of which is shown in FIGURE 1 as at 20.

It has become necessary to provide a seal which can resist pressure differential forces due to the variance of pressure within and outside the motor housing, which seal will also readily allow assembly and disassembly of parts within the housing 16 and form a bearing support for reciprocating structures. My invention provides a sealing structure A which meets the above requirements.

In more detail, I prefer to utilize a preformed rubber body 22 (see FIGURE 2) with a preformed plastic member 24 such that the seal 22 is assembled to the member 24 by pressing the headed projections 26 of seal 22 through openings 28 in the member 24 until the head of the projection engages the face 30 of member 24 whereupon the member 24 rests within a cavity 32 of the seal 22.

The member 24 may be of plastic construction, as shown, or of a metallic nature such as brass or the like. In any event, the inner diameter of the member 24 is chosen to be larger than the inner diameter of the seal lip 34, so that the lip 34 may slidingly engage the valve housing 18 to permit sealing and assembly of the seal to the housing 16.

The assembly of the seal to the housing 16 merely involves the insertion of an annular flange 36 (see FIGURE 1) into the remaining space in the cavity 32 above the member 24, which space is designed to be of smaller dimension than the cross sectional dimension of the annular flange 36. Thus, the seal is held to the housing structure 16 by the interference fit between the flexible seal member 22 and the reinforcing member 24.

If preferred, the flexible seal 22 may be molded directly around the reinforcing member 24, as may be readily appreciated by those skilled in the art. In fact, such a seal would have less tendency of pressure blow-out, and, therefore, would be more dependable while sacrificing cost of construction.

Although the inner diameter of member 24 is larger than that of the lip 34 it is of such a size to permit sliding movement of reciprocating structures, such as housing 18. Thus one has a seal and bearing which may be easily installed and removed. If preferred, the member 24 could be provided with lubricant properties on the inner surface such as Teflon coating, etc. to reduce friction.

The servomotor, as shown, is also provided with a companion seal (not shown) at the opposite end of that which is shown, and as the rubber body completely encloses the reinforcing bearing member, the seal structure A may be utilized as a bump stop for a movable wall (not shown) in servomotor 10.

While only one form of my invention is above described, I do not intend to be foreclosed by the description relating thereto from constructions which my invention may take. Therefore, in accordance with the applicable rules and regulations I wish to be limited by the appended claims.

I claim:
1. A seal for an opening between an inner and outer housing portion, which seal comprises:
   a reinforcing member having spaced apertures;
   a flexible body having a depending lip, a plurality of headed projections and a cavity for receipt of said reinforcing member when said headed projections are placed through said apertures such that an interference fit is formed between said flexible body and said reinforcing member for said housing portion to hold said flexible body to said housing portion.

2. A structure for effecting a sliding seal around a reciprocating member which projects out of an opening in a housing member, said seal comprising:
   a reinforcing member having a plurality of openings therethrough and an inner bearing surface; and
   a body of softer construction than said reinforcing member, which body is adapted to be held to said reinforcing member through said openings in said reinforcing member and to said housing member by an interference fit therewith.

3. A structure for effecting a sliding seal around a reciprocating member which projects out of an opening in a housing member, said seal comprising:

an annular reinforcing member having a plurality of openings therethrough, a radially extending flange and an inner bearing surface; and an annular flexible body having a cavity for receiving said annular reinforcing member such that a narrow space is left between said reinforcing member and said flexible body in said cavity, which narrow space is of smaller dimension than a cross sectional dimension of said housing member to create an interference fit with said housing member when said flexible body is pressed thereon until housing member abuts said flange, said flexible body also being adapted to positively engage said reinforcing member with said bearing surface of said reinforcing member slidingly supporting said reciprocating member while said flexible body maintains a sliding seal with said reciprocating member.

References Cited in the file of this patent

UNITED STATES PATENTS 2,815,973     Jackson _____ Dec. 10, 1957